July 15, 1924.
S. M. SAWYER
SPRING LOCKING DEVICE
Filed May 19, 1921
1,501,374
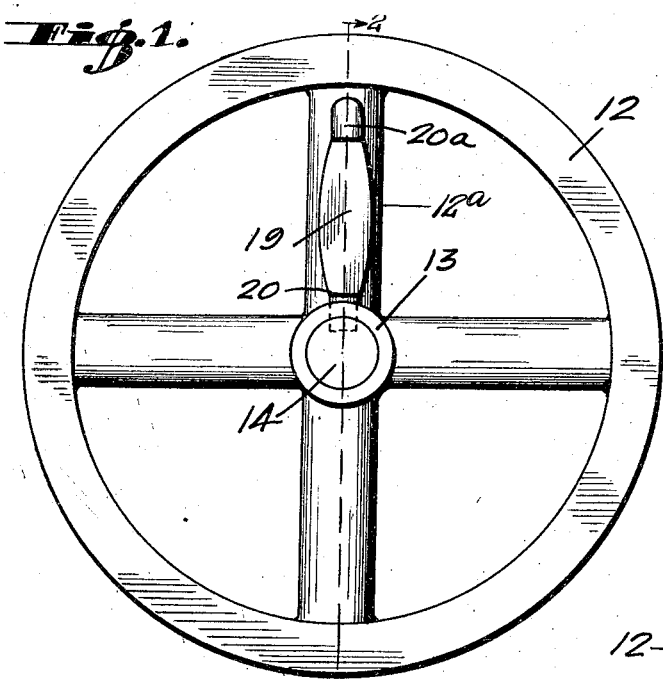
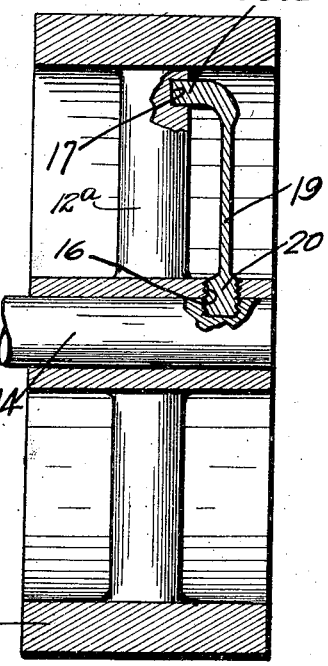
Samuel M. Sawyer
INVENTOR.
BY
Hazard & Miller
ATTORNEYS.

Patented July 15, 1924.

1,501,374

UNITED STATES PATENT OFFICE.

SAMUEL M. SAWYER, OF LOS ANGELES, CALIFORNIA, ASSIGNOR OF ONE-FOURTH TO CLAUDE C. LUCE, OF LOS ANGELES, CALIFORNIA.

SPRING LOCKING DEVICE.

Application filed May 19, 1921. Serial No. 470,855.

*To all whom it may concern:*

Be it known that I, SAMUEL M. SAWYER, a citizen of the United States, residing at Los Angeles, in the county of Los Angeles and State of California, have invented new and useful Improvements in Spring Locking Devices, of which the following is a specification.

It is the object of this invention to provide a locking means for preventing disengagement of various parts of machines, and the like, which are subjected to excessive vibration, or which are liable to become disengaged from other causes. The improved locking means may be employed for securing rotatable members, such as pulleys and fly wheels, upon their shafts.

The invention is also capable of use in various other ways and in conjunction with various parts of machinery, the essential element of the locking device, in whatever manner it is employed, being a spring member adapted to be secured to relatively movable members which are to be locked, and with said spring under tension so as to hold the same in said locking position and at the same time prevent relative movement of the parts which are being locked.

The invention will be readily understood from the following description of the accompanying drawings, in which:

Fig. 1 is a front elevation of a fly wheel mounted upon a shaft and showing the improved locking means employed for securing the fly wheel to its shaft.

Fig. 2 is an axial section on the line 2—2 of Fig. 1.

In the form of the invention illustrated in Figs. 1 and 2, I have shown a fly wheel 12 having a hub 13 mounted upon a shaft 14, and the improved spring locking means is employed for securing the hub of the fly wheel to the shaft. For this purpose a recess 16 is formed in hub 13 and into shaft 14, and a recess 17 is provided in one of the spokes 12ª of the fly wheel.

A spring locking means is received at its respective ends in recesses 16—17, and in the present instance this spring locking member is shown as a spring rod which is flattened intermediate of its ends, as shown at 19, and provided with end portions 20 and 20ª. The end portion 20 is received in recess 16, and these parts preferably have a threaded connection, as clearly shown in Fig. 2. The end portion 20ª of the spring is bent laterally so as to be readily received in recess 17, and it will be understood that the parts are so arranged that with the spring in position, it is under sufficient tension to hold it against displacement, and as a consequence it will form a positive lock for securing the fly wheel upon its shaft.

Various changes may be made without departing from the spirit of the invention as claimed.

What is claimed is:

The combination with relatively movable members, of locking means for the same including a spring having a threaded connection at one end with one of said members and received at its other end in a recess in the second member.

In testimony whereof I have signed my name to this specification.

SAMUEL M. SAWYER.